July 12, 1927.

A. A. C. OHLSEN 1,635,726

SAFETY DEVICE FOR HIGH TENSION WIRES

Original Filed Jan. 14, 1924

INVENTOR.
ARTHUR A. C. OHLSEN.

BY
Dewey, Strong, Townsend & Loftus.
ATTORNEYS.

Patented July 12, 1927.

1,635,726

UNITED STATES PATENT OFFICE.

ARTHUR A. C. OHLSEN, OF SAN FRANCISCO, CALIFORNIA.

SAFETY DEVICE FOR HIGH-TENSION WIRES.

Application filed January 14, 1924, Serial No. 685,994. Renewed May 9, 1927.

This invention relates to a safety device for emergency use in handling high tension wires.

At the time of fires in buildings, residences and the like, it often occurs that the electric power wires fall and must be immediately handled to prevent further damage and accident. At the present time inadequate means are provided to make it possible for firemen to handle these wires with safety, and it is the principal object of the present invention to provide a simple appliance which may be conveniently carried as part of the equipment of a fire company to grasp and carry or otherwise manipulate high tension electric wires.

The present invention contemplates the use of a pair of complementary members preferably formed of dielectric material and adapted to grasp a wire at one end thereof and to hold the wire thus grasped so that it may be supported in a convenient position out of danger, or otherwise manipulated.

The invention is illustrated by way of example in the accompanying drawings in which.

Figure 1:
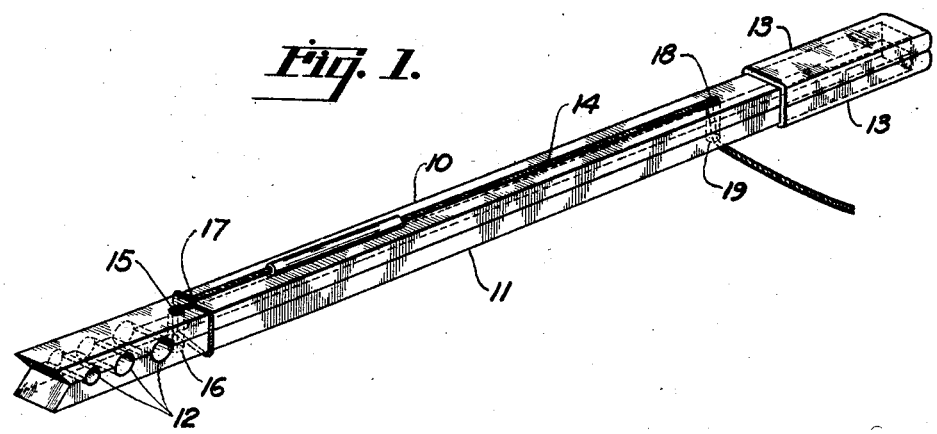
Fig. 1 is a view in perspective showing the complete invention and indicating the wire receiving grooves in dotted lines.
Figure 2:
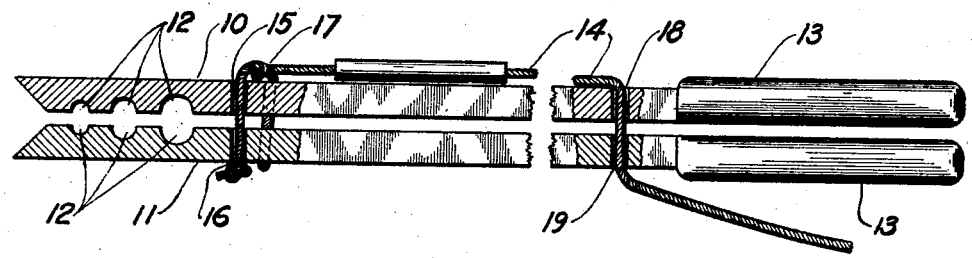
Fig. 2 is a view in side elevation with parts broken away showing the details of construction of the invention.

Referring more particularly to the drawings, 10 and 11 indicate complementary tong members formed at one end with jaw portions characterized by having a series of grooves 12 extending across the faces of the jaw portions, the separate grooves being described by different arcs to accommodate wires of different diameters. The terminating ends of the jaw sections are inclined to form a V-shaped throat acting to guide a wire in between the jaws. The length of the tong members may be as desired, although it has been found that a length which would permit an operator to grasp the end of the tongs opposite from the jaws and still be able to manipulate the fastening which is disposed near the jaws is preferred. Upon the end of the tongs to be grasped additional insulation is placed in the form of hand grips 13, preferably made of rubber.

Attention is directed to the fact that the tong members are not pivoted to each other in the usual fashion, but are connected by a flexible means, as, for example, the cord 14. This cord passes through openings 15 and 16 formed through the tong members near the jaw portions and is preferably passed around the two tong members in the form of a half hitch as indicated at 17. The cord is then led along one of the tong members and passed through openings 18 and 19 near the handle. The cord may be secured by making another half hitch around the tongs or by otherwise tying the same. It is desirable that this cord be of sufficient length to permit it to be thrown over trolley supporting wires or other such members to tie the tongs to them.

In operation of the present invention the two tongs may be separated by loosening the cord 14, after which the jaws may be drawn together and fastened by pulling the cord 14 and then fastening the cord in a suitable manner around the tong members.

While I have shown the preferred form of my invention as now known to me, it will be understood that various changes might be made in the combination, construction and arrangement of parts by those skilled in the art, without departing from the spirit of the invention as claimed.

Having thus described my invention, what I claim and desire to secure by Letters Patent is:

1. A device of the character described comprising a pair of elongated bars formed of dielectric material, said bars being separable and lying substantially parallel to each other during separation, serrated portions formed along the contacting faces of said bars and at one end thereof, and manually operated means whereby the bars when separated may be pulled together to grip a member disposed between said serrated faces.

2. A device of the character described comprising a pair of tong members formed of dielectric material and being substantially in the shape of straight bars, serrated faces formed at one end of each of the tong members to provide a jaw portion, a flexible fastening member passing through the two tong members adjacent the jaw portions thereof, thereafter passing along one of the tong members and again passing through the tong members whereby the two tong members may be temporarily tied together when desired.

ARTHUR A. C. OHLSEN.